W. J. COX.
NUT LOCK.
APPLICATION FILED NOV. 11, 1919.

1,364,077.

Patented Jan. 4, 1921.

INVENTOR.
W. J. Cox.
by
Lacey & Lacey, Attys.

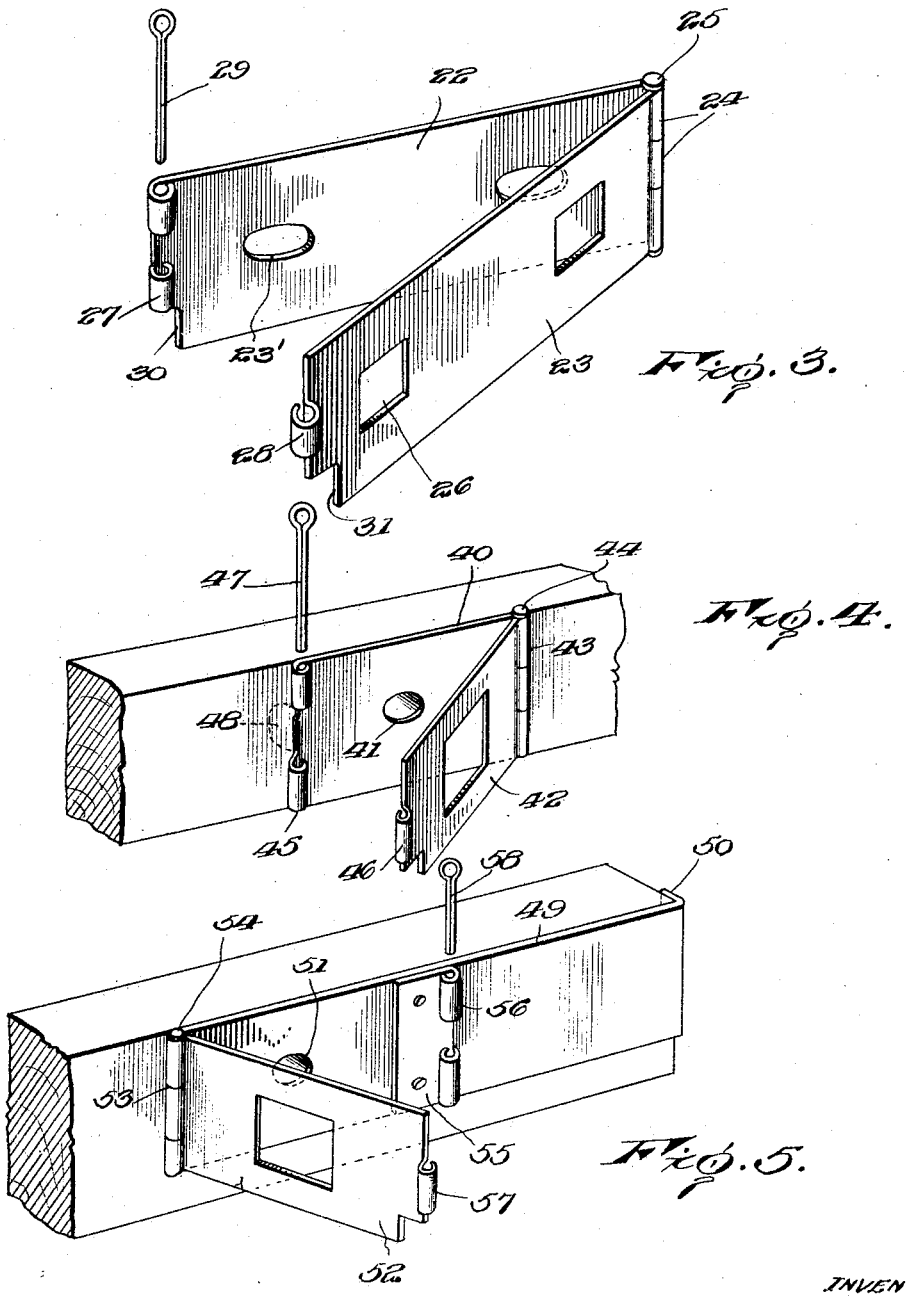

UNITED STATES PATENT OFFICE.

WILLIAM J. COX, OF BOLIVAR, MISSOURI.

NUT-LOCK.

1,364,077.

Specification of Letters Patent. Patented Jan. 4, 1921.

Application filed November 11, 1919. Serial No. 337,342.

*To all whom it may concern:*

Be it known that I, WILLIAM J. COX, a citizen of the United States, residing at Bolivar, in the county of Polk and State of Missouri, have invented certain new and useful Improvements in Nut-Locks, of which the following is a specification.

This invention relates to improvements in nut locks especially adapted for preventing accidental loosening of the bolts employed for connecting rail couplings.

An important object of this invention is to provide a locking device for the bolts of rail couplings which may be readily and conveniently applied for rigidly securing the couplings in position.

A further object of the invention is to provide a nut locking device consisting of a base plate adapted to be arranged on one side of a coupling and provided with a novel form of locking plate adapted to be engaged with the nuts for preventing accidental rotation of the same.

A further object of this invention is to provide a nut lock especially adapted for use on rail couplings and having novel means to permit of the expansion and contraction of the rails as the result of changes in temperature.

A further object of the invention is to provide a nut lock of the character described which is simple, of highly simplified construction and cheap to manufacture.

Other objects and advantages of the invention will be apparent during the course of the following description.

In the accompanying drawings forming a part of this application and in which like numerals are employed to designate like parts throughout the same, Figure 1 is a side elevation of the improved nut lock applied;

Fig. 3 is a perspective of the same detached;

Fig. 4 is a perspective of a modified form of locking plate applied;

Fig. 5 is a perspective of a further modified form of locking plate applied.

Figure 1:
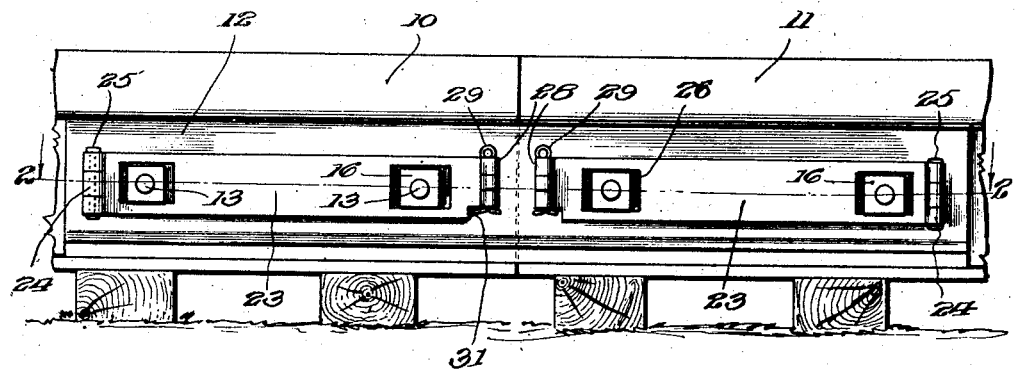
Figure 2:
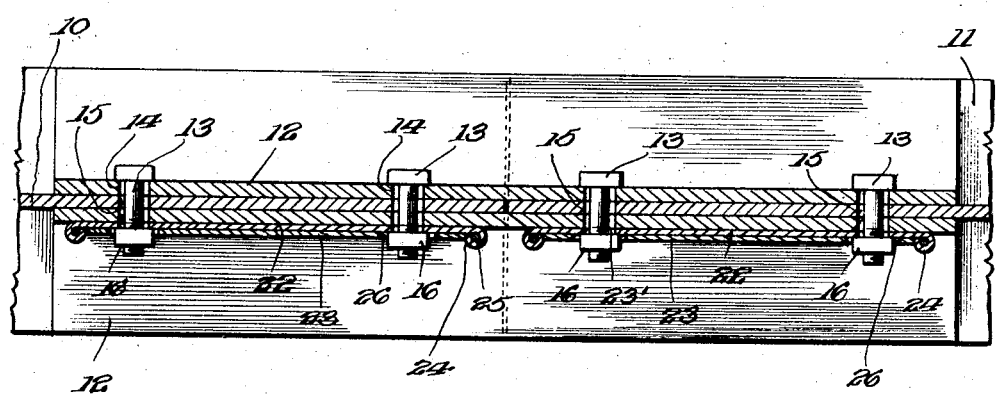
Fig. 2 is a longitudinal horizontal section through the same.

In the drawings wherein for the purpose of illustration is shown a preferred embodiment of the invention, the numerals 10 and 11 designate a pair of rails arranged in end to end relation and connected by angle plates 12 extending over the meeting ends of the rails. As illustrated in Fig. 2, a plurality of spaced bolts 13 are extended through oval shaped openings 14 in the angle plates and through similar openings 15 in the webs of the rails and have threaded engagement with nuts 16 for securely attaching the angle plates to the rails. A nut locking device, clearly illustrated in Fig. 3, includes an elongated base plate 22 having a pair of spaced oval shaped openings 23 adapted to receive the end portions of the bolts 14 upon being passed through the angle plates. After the base plate 22 has been applied, the nuts 16 are threaded tightly on to the forward portions of the bolts and are drawn into rigid engagement with the base plate 22 for securely connecting the angle plates to the rails. One end portion of the base plate 22 hingedly supports a locking plate 23 through the medium of a plurality of alining hinge barrels 24 and a hinge pin 25. The locking plate 23 is provided with a pair of elongated openings 26 adapted to receive the nuts 16 for locking the same against accidental rotation. With reference to Fig. 2, it will be noted that the openings 26 are slightly longer than the nuts 16 are wide, whereby a limited movement of the nuts 16 within the openings 26 is permitted as the result of expansion and contraction of the rails. The hinge barrels 24 are arranged outwardly of the base plate 22 to permit the locking plate 23 to be arranged flush with the outer side of the base plate. The forward end of the base plate 22 is provided with a pair of spaced alining barrels 27 adapted to be arranged on the opposite sides of a barrel 28 for receiving a locking device 29, which in this case is a cotter pin. The free end portions of the plates 22 and 23 are cut away as indicated at 30 and 31 to permit the arms of the cotter pin 29 to be readily spread.

In the form of the invention illustrated in Fig. 4, a locking device adapted for use in connection with work other than rail joints includes a base plate 40 provided with a centrally arranged opening 41 adapted to receive the forward end of a bolt. One end portion of the base plate 40 is hingedly connected to a locking plate 42 by a plurality of alining hinge barrels 43 carried by the adjacent ends of the plates 40 and 42. A hinge pin 44 is passed through the hinge barrels 43 for detachably connecting the locking plate to the base plate 40. The free end portion of the base plate and the free end portion of the locking plate are provided with sleeves 45 and 46 respectively which are adapted to be alined for receiving a locking pin 47, whereby the locking plate 42 may be secured flush with the base plate 40. An anchoring lug 48 is extended beyond the base plate 40 between the barrels 45 of the base plate and is adapted to be embedded in the work for preventing accidental rotation of the base plate 40. As illustrated, the anchoring lug 48 is formed integral with the base plate and extended inwardly from the same and is adapted to be received within an opening in the work.

In the form of the invention illustrated in Fig. 5, the base plate 49 is of elongated formation and is provided at one end with an inwardly projecting anchoring lug 50 adapted to extend over one end of the work upon being applied. An opening 51 is provided in the base plate 49 and adapted to receive the forward end of a bolt upon being passed through the work. A locking plate 52 is hingedly connected to one end portion of the base plate 49 by alining hinge barrels 53 and the hinge pin 54. A fastening plate 55 is riveted or otherwise rigidly secured to the intermediate portion of the elongated base plate 49 and is provided with a pair of alining barrels 56 with which a sleeve 57 carried by the locking plate 52 is adapted to aline for the reception of a cotter pin 58. When the base plate 49 is applied, the lug 50 of the same is extended over one edge or side of the work for preventing accidental rotation of the base plate. After the bolt has been passed through the opening 51 and the nut threaded onto the same, the locking plate 52 is engaged with the nut for securely locking the same in position.

In the practice of the invention, the bolt locking member 17 is arranged on one side of the work for securing the heads of the bolts against rotation. After the bolts have been passed through the work, the nuts are threaded into the same and are subsequently engaged by the several hinged locking plates. After the locking plates have been secured in position, the bolts are rigidly secured in position and are prevented from loosening as the result of vibration on the rails.

When desired, the bolts may be readily removed by moving the locking plates on their hinges out of the way of a wrench or other tool employed for loosening the nuts.

It is to be understood that the form of the invention herewith shown and described is to be taken as a preferred example of the same and that such minor changes in arrangement and construction of parts may be made as will remain within the spirit of the invention and the scope of what is claimed.

Having thus described the invention, what is claimed is:

A locking device including a base plate having a bolt-receiving opening, a locking plate hingedly connected to one end of said base plate and having means for engagement with a nut, coacting sleeves carried by the free end portion of said locking plate and the adjacent end portion of said base plate, and a cotter pin inserted through said sleeves, the lower corner of the free end of the locking plate and the lower corner of the adjacent end of the base plate being cutaway to form registering seats adapted to receive the terminals of the cotter pin when said terminals are bent laterally.

In testimony whereof I affix my signature.

WILLIAM J. COX. [L. S.]

Witnesses:
 CARL C. BLUE,
 ANNIS F. BLUE.